(12) United States Patent　　(10) Patent No.:　　US 12,559,056 B1

Koh　　(45) Date of Patent:　　Feb. 24, 2026

(54) AIRBAG DEVICE FOR VEHICLE

(71) Applicant: HYUNDAI MOBIS CO., LTD., Seoul (KR)

(72) Inventor: Min Seok Koh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/070,779

(22) Filed: Mar. 5, 2025

(51) Int. Cl.
| | |
|---|---|
| B60R 21/2338 | (2011.01) |
| B60R 21/217 | (2011.01) |
| B60R 21/231 | (2011.01) |
| B60R 21/233 | (2006.01) |
| B60R 21/2334 | (2011.01) |
| B60R 21/237 | (2006.01) |
| B60R 21/205 | (2011.01) |
| B60R 21/235 | (2006.01) |

(52) U.S. Cl.
CPC ........ B60R 21/2334 (2013.01); B60R 21/217 (2013.01); B60R 21/231 (2013.01); B60R 21/237 (2013.01); *B60R 21/205* (2013.01); *B60R 2021/23308* (2013.01); *B60R 2021/23324* (2013.01); *B60R 2021/23382* (2013.01); *B60R 2021/23576* (2013.01)

(58) Field of Classification Search
CPC ........... B60R 21/2334; B60R 21/2338; B60R 21/205; B60R 21/217; B60R 21/237; B60R 21/231; B60R 21/233; B60R 2021/23382; B60R 2021/161; B60R 2021/23308; B60R 2021/23316; B60R 2021/23324; B60R 2021/23571; B60R 2021/23576
USPC ................ 280/728.2, 729, 732, 743.1, 743.2
See application file for complete search history.

(56) References Cited

U.S. PATENT DOCUMENTS

| | | | |
|---|---|---|---|
| 7,862,082 B2 | 1/2011 | Thomas | |
| 2003/0034639 A1* | 2/2003 | Amamori | B60R 21/233 |
| | | | 280/729 |
| 2014/0265269 A1 | 9/2014 | Fischer et al. | |
| 2021/0229621 A1* | 7/2021 | Shin | B60R 21/2346 |
| 2023/0264646 A1* | 8/2023 | Barnes | B60R 21/205 |
| | | | 280/743.2 |

(Continued)

FOREIGN PATENT DOCUMENTS

| | | | | |
|---|---|---|---|---|
| DE | 102012018450 A1 * | 3/2014 | .......... | B60R 21/205 |
| DE | 102020121351 A1 * | 2/2022 | .......... | B60R 21/231 |

(Continued)

OTHER PUBLICATIONS

Extended European Search Report issued on Sep. 11, 2025, in counterpart European Patent Application No. 25161909.4. (10 pages in English).

*Primary Examiner* — Keith J Frisby

(74) *Attorney, Agent, or Firm* — NSIP Law

(57) ABSTRACT

An airbag device for a vehicle is provided. The airbag device includes an inflator to generate gas upon activation, a cushion associated with the inflator and to expand as the gas is introduced from the inflator, and inflate toward an occupant of the vehicle, and an inner chamber disposed inside the cushion and to distribute the gas introduced into the cushion, the inner chamber including a tip portion and a portion facing a windshield of the vehicle. The tip portion of the inner chamber is joined to a portion of the cushion that faces the windshield, and the inner chamber pulls the cushion as the cushion unfolds to prevent the cushion from colliding with the windshield.

12 Claims, 8 Drawing Sheets

(56) References Cited

U.S. PATENT DOCUMENTS

2024/0217471 A1 * 7/2024 Jadhav .................... B60R 21/26

FOREIGN PATENT DOCUMENTS

| | | | | | |
|---|---|---|---|---|---|
| FR | 3 120 583 | A1 | | 9/2022 | |
| JP | 3071015 | B2 | * | 7/2000 | |
| JP | 4875512 | B2 | | 2/2012 | |
| JP | 7603637 | B2 | * | 12/2024 | |
| KR | 20000019662 | A | * | 4/2000 | ............. B60R 21/16 |
| KR | 20130129653 | A | * | 11/2013 | ........... B60R 21/233 |
| KR | 20140013361 | A | * | 2/2014 | ........ B60R 21/2346 |
| KR | 20190115787 | A | * | 10/2019 | ........ B60R 21/2346 |
| WO | WO-0015472 | A1 | * | 3/2000 | ........ B60R 21/2338 |

* cited by examiner

AIRBAG DEVICE FOR VEHICLE

BACKGROUND

1. Field

The present invention relates to an airbag device for a vehicle, and more particularly, to an airbag device for a vehicle, which prevents an inflated cushion from colliding with a windshield of a vehicle.

2. Description of the Related Art

In general, an airbag device for a vehicle is installed inside a vehicle to protect an occupant seated in a driver seat or a passenger seat from an impact in the event of a collision accident. Examples of the airbag device include a driver seat airbag device, a passenger seat airbag device, and a side airbag device.

Among them, the passenger airbag device is installed on an instrument panel to protect a passenger in the passenger seat, and there is a problem in that, when a cushion is unfolded, the cushion collides with a windshield disposed in front of the vehicle and thus damages the windshield.

In this way, when the windshield is damaged, replacement costs may be added, and the passenger may be injured. Therefore, it is required to solve this problem.

SUMMARY

The present disclosure seeks to provide solutions to solve the above-mentioned problems and aims to provide an airbag device for a vehicle capable of preventing collision between an inflated cushion and a windshield and thus safely protecting an occupant.

The objects of the present invention are not limited to the problems described above, and those skilled in the art will clearly understand other objects not described based on the following description.

In a general aspect of the disclosure, an airbag device for a vehicle, includes: an inflator configured to generate gas upon activation; a cushion associated with the inflator and configured to expand as the gas is introduced from the inflator, and inflate toward an occupant of the vehicle; and an inner chamber disposed inside the cushion and configured to distribute the gas introduced into the cushion, the inner chamber including a tip portion and a portion facing a windshield of the vehicle, wherein the tip portion of the inner chamber is joined to a portion of the cushion that faces the windshield, and wherein the inner chamber is configured to pull the cushion as the cushion unfolds to prevent the cushion from colliding with the windshield.

The cushion may include a main panel including a mouth portion in which a gas hole through which the gas is introduced is formed and a protrusion corrugated portion, and a pair of side panels joined to both sides of the main panel, wherein the main panel may be partitioned into a first section on one side toward the windshield and a second section and a third section on another side toward the occupant when the cushion is expanded with respect to the mouth portion, and wherein a width of the third section may be greater than a width of the second section and a width of the first section.

The protrusion corrugated portion may be configured to form a protruding folding structure by tuck-in folding a partial area in the first section of the main panel.

The inner chamber may include a chamber strap in which a flow hole is disposed, wherein the chamber strap may be joined to the mouth portion in a structure in which the flow hole is connected to the gas hole, and both end portions of the chamber strap in a longitudinal direction may be joined to the protrusion corrugated portion to form an inner space in which the gas is introduced through the gas hole and the flow hole.

The chamber strap may include joining portions disposed at both ends thereof by folding portions of the ends thereof, and a structure in which the joining portion may form a stacked structure together with the protrusion corrugated portion and is integrally joined to the protrusion corrugated portion.

The chamber strap may include joining portions formed at both ends thereof by folding portions of the ends thereof, and a structure in which the protrusion corrugated portion is integrally joined to the joining portions while inserted into the joining portions so that the joining portions surround the protrusion corrugated portion.

The chamber strap may include joining portions formed at both ends thereof by folding portions of the ends thereof, and a structure in which the joining portions are integrally joined to the protrusion corrugated portion while inserted into the protrusion corrugated portion so that the protrusion corrugated portion surrounds the joining portions.

A seam direction of the protrusion corrugated portion and a seam direction of the joining portion may be arranged in the same direction.

A surface of the chamber strap, which is exposed to the inner space, may be coated with silicone.

The inner chamber may further include a reinforcing strap having one end joined to the mouth portion and connected to the flow hole and another end joined to the protrusion corrugated portion together with the chamber strap.

In another general aspect of the disclosure, an airbag device for a vehicle having a windshield, includes: an inflator configured to generate gas upon activation; a cushion in communication with the inflator and configured to expand as the gas is introduced from the inflator, and inflate toward an occupant of the vehicle; and an inner chamber disposed inside the cushion and configured to distribute the gas introduced into the cushion, the inner chamber including a tip portion and a portion facing a windshield of the vehicle, wherein the tip portion of the inner chamber is joined to a portion of the cushion that faces the windshield, and wherein the inner chamber is configured to pull the cushion as the cushion unfolds to prevent the cushion from colliding with the windshield while allowing the cushion to unfold toward the occupant.

The cushion may include a main panel including a mouth portion in which a gas hole through which the gas is introduced is formed, and a protrusion corrugated portion, and a pair of side panels joined to both sides of the main panel, wherein the main panel may be partitioned into a first section on one side toward the windshield, and a second section and a third section on another side toward the occupant when the cushion is expanded with respect to the mouth portion, and wherein a width of the third section may be greater than a width of the second section and a width of the first section.

The protrusion corrugated portion may be configured to form a protruding folding structure by tuck-in folding a partial area in the first section of the main panel.

The inner chamber may include a chamber strap in which a flow hole is disposed, wherein the chamber strap may be joined to the mouth portion in a structure in which the flow hole is connected to the gas hole, and both end portions of the chamber strap in a longitudinal direction may be joined to the protrusion corrugated portion to form an inner space in which the gas is introduced through the gas hole and the flow hole.

Figure 1:
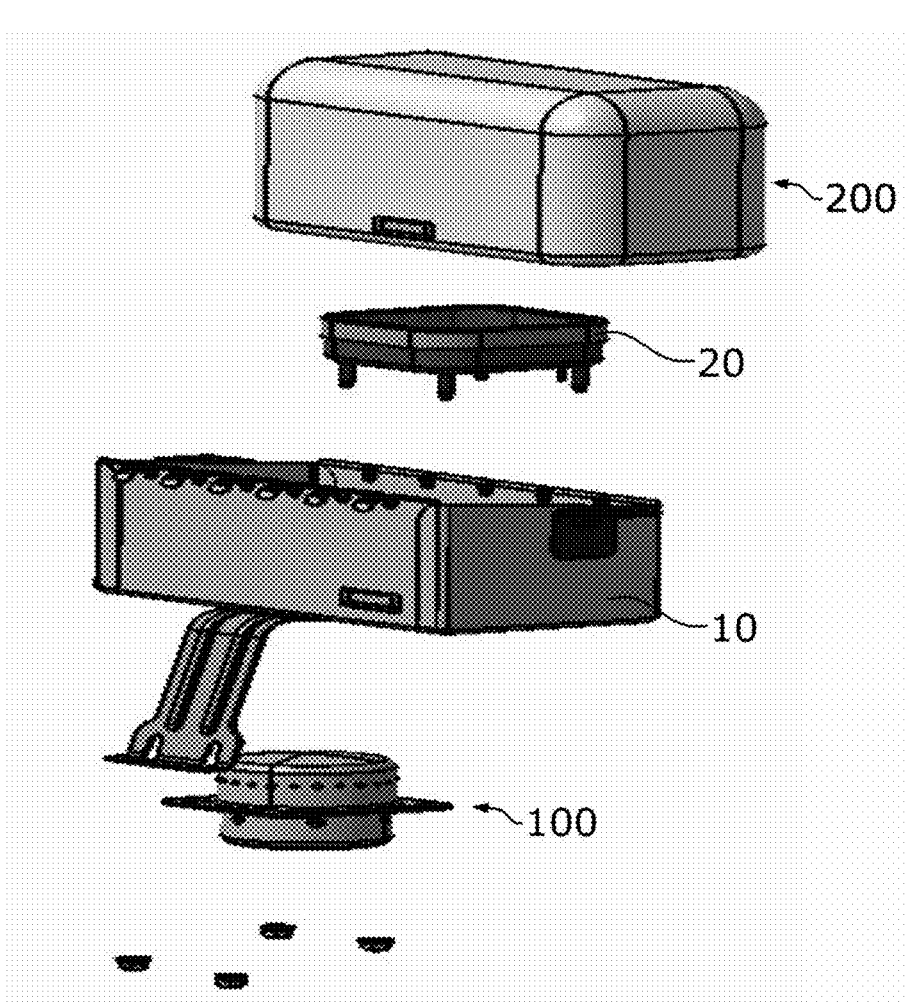
FIG. 1 is a view illustrating a configuration of an airbag device according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
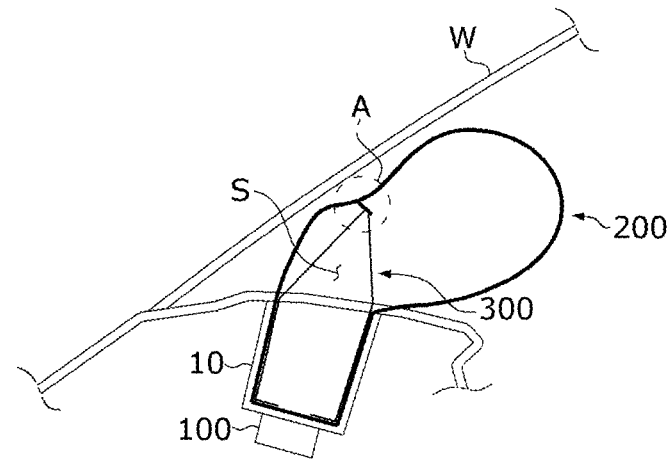
FIG. 2 is a schematic view illustrating a state in which a cushion and an inner chamber of the airbag device are unfolded.
Figure 3:
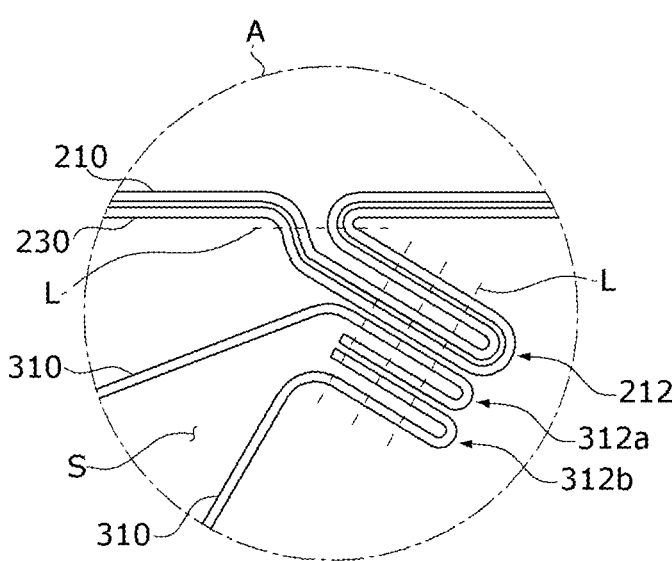
FIG. 3 is a view illustrating portion "A" in FIG. 2.
Figure 4:
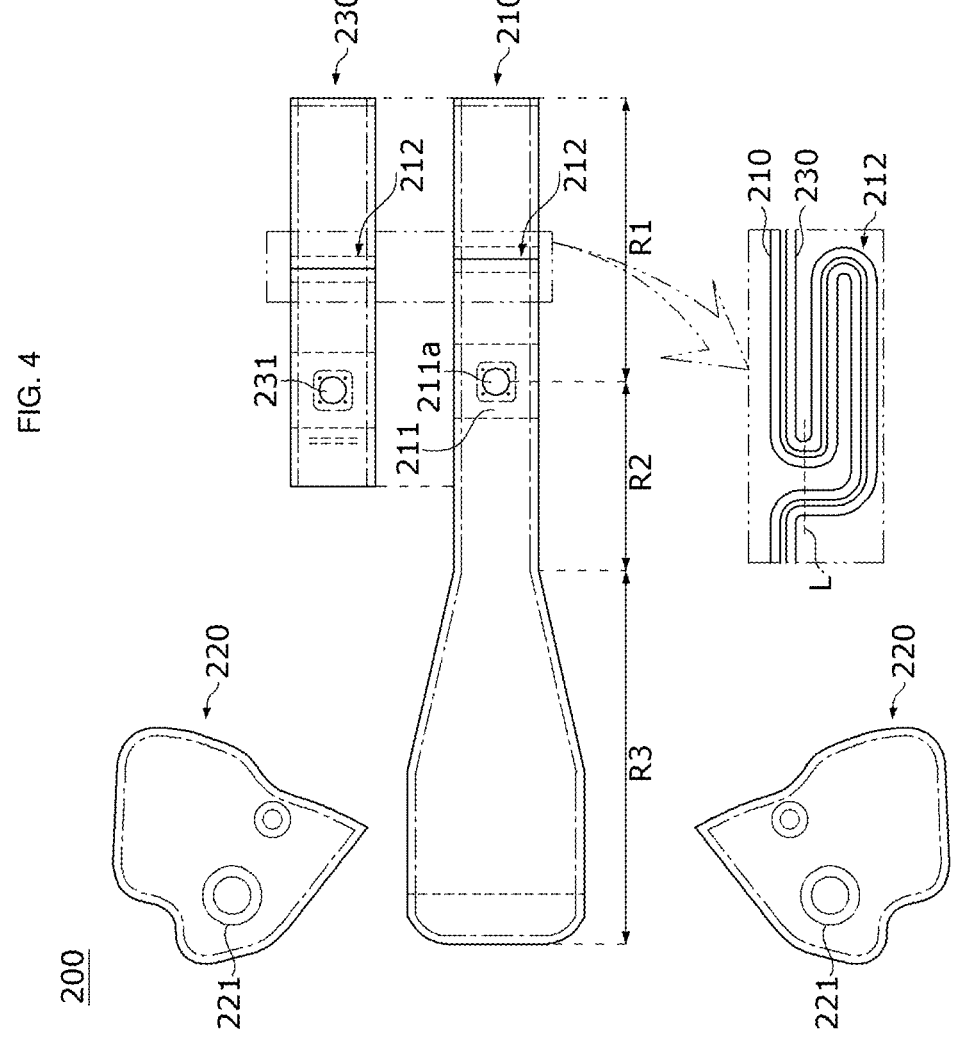
FIG. 4 is a view illustrating a configuration of the cushion in the airbag device.
Figure 5A:
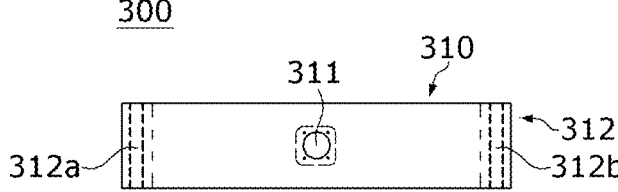
FIGS. 5A and 5B are views illustrating a configuration of the inner chamber in the airbag device.
Figure 5B:
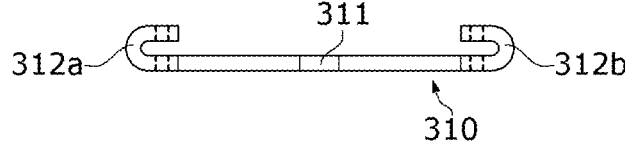
Figure 6:
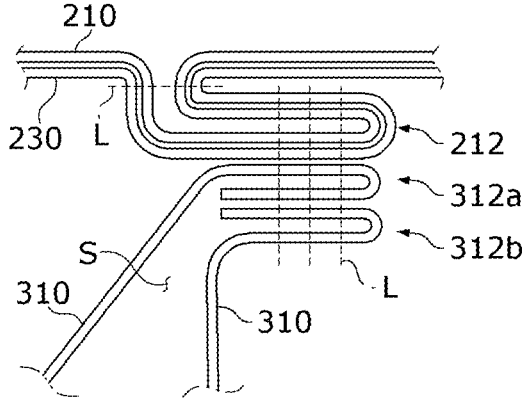
FIG. 6 is a view illustrating a state in which a chamber strap of the inner chamber is joined to a protrusion corrugated portion of the cushion through a joining portion according to an embodiment.
Figure 7:
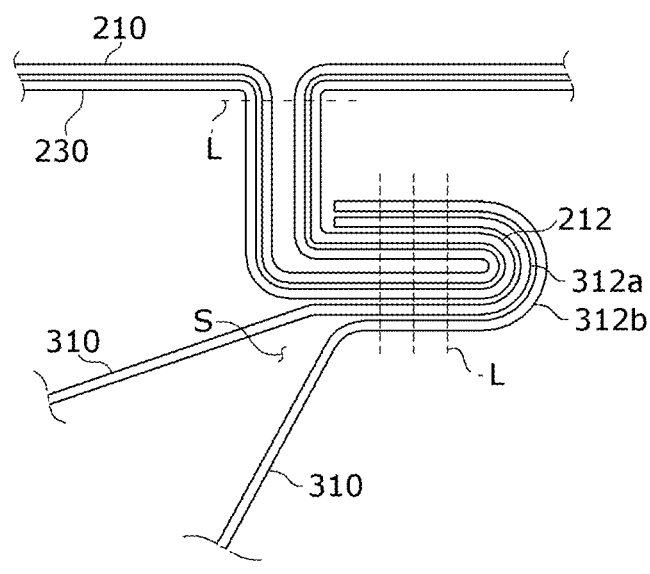
FIG. 7 is a view illustrating a state in which the chamber strap of the inner chamber is joined to the protrusion corrugated portion of the cushion through the joining portion according to another embodiment.
Figure 8:
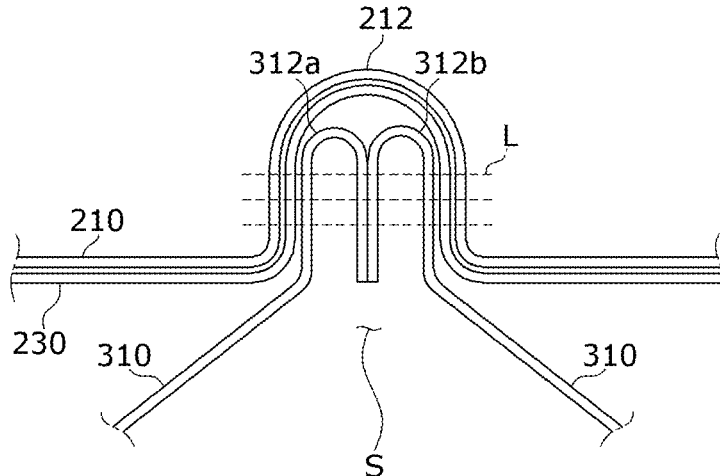
FIG. 8 is a view illustrating a state in which the chamber strap of the inner chamber is joined to the protrusion corrugated portion of the cushion through the joining portion according to still another embodiment.

FIG. 1 is a view illustrating a configuration of an airbag device according to an embodiment of the present invention, FIG. 2 is a schematic view illustrating a state in which a cushion and an inner chamber of the airbag device are unfolded, and FIG. 3 is a view illustrating part "A" in FIG. 2. FIG. 4 is a view illustrating a configuration of the cushion in the airbag device, FIGS. 5A and 5B are views illustrating a configuration of the inner chamber in the airbag device, FIG. 6 is a view illustrating a state in which a chamber strap of the inner chamber is joined to a protrusion corrugated portion of the cushion through a joining portion according to an embodiment, FIG. 7 is a view illustrating a state in which the chamber strap of the inner chamber is joined to the protrusion corrugated portion of the cushion through the joining portion according to another embodiment, and FIG. 8 is a view illustrating a state in which the chamber strap of the inner chamber is joined to the protrusion corrugated portion of the cushion through the joining portion according to still another embodiment.

Referring to the drawings, an airbag device according to an embodiment of the present invention may include an inflator 100, a cushion 200, and an inner chamber 300.

The inflator 100 may be configured to generate gas according to a signal of an airbag control unit (ACU) that is not illustrated when a vehicle collision accident occurs.

The inflator 100 may be mounted outside a housing 10 and connected to the cushion 200. The gas generated by the inflator 100 may be introduced into the cushion 200 to expand the cushion 200.

The cushion 200 may be expanded as the gas is introduced and may be unfolded toward an occupant. The cushion 200 may be fixedly mounted inside the housing 10 through a retainer 20.

As illustrated in FIG. 4, the cushion 200 may include a main panel 210 and a pair of side panels 220.

The main panel 210 and the side panels 220 may be made of a flexible fabric material. Further, the main panel 210 and the side panels 220 may be made of a flexible synthetic fiber material, but the material is not limited thereto.

The side panels 220 may be joined to both sides of the main panel 210 to form a chamber expanded by the gas with the main panel 210. A vent hole 221, through which the introduced gas is discharged to the outside, may be formed in the side panel 220.

The main panel 210 may include a mouth portion 211 in which a gas hole 211a through which the gas is introduced is formed and a protrusion corrugated portion 212. The retainer 20 may be coupled to the mouth portion 211. Further, the inner chamber 300, which will be described below, may be coupled to the mouth portion 211 and the protrusion corrugated portion 212.

The main panel 210 may be formed in a band shape extending to be elongated in a longitudinal direction and may be partitioned into a first section R1 on one side toward a windshield W of the vehicle and a second section R2 and a third section R3 on the other side toward the occupant when the cushion 200 is expanded with respect to the mouth portion 211.

The first section R1 has a structure of which a width is constant as a whole, and the protrusion corrugated portion 212 may be formed therein. A rear end of the first section R1 may be connected to a tip of the third section R3.

The second section R2 corresponds to a section toward a lower body of the occupant when the cushion 200 is expanded and may be connected to the first section R1 with the mouth portion 211 interposed therebetween. Like the first section R1, the second section R2 may also have a structure of which a width is constant.

The third section R3 corresponds to a section toward an upper body of the occupant when the cushion 200 is expanded. The width of the third section R3 is greater than the width of the second section R2 and the width of the first section R1 and is decreased from the tip to a rear end connected to the second section R2.

As illustrated in the drawing, the protrusion corrugated portion 212 may be configured to form a folding structure protruding inside the cushion 200 by tuck-in folding a partial area in the first section R1 of the main panel 210. That is, the protrusion corrugated portion 212 may be provided as a portion in which a portion of the main panel 210 overlaps in two layers.

Of course, the protrusion corrugated portion 212 may be configured to form a folding structure protruding outward from the cushion 200 by tuck-in folding the partial area in the first section R1 of the main panel 210.

The protrusion corrugated portion 212 may be formed in a portion of the main panel 210, which may come in contact with the windshield W when the cushion 200 is expanded.

In the embodiment, the cushion 200 may further include a reinforcing panel 230 attached to the main panel 210.

The reinforcing panel 230 may be provided as a structure that partially covers the first section R1 and the second section R2 of the main panel 210 and provided with a connection hole 231 connected to the gas hole 211a. Further, while the reinforcing panel 230 is attached to the main panel 210, the protrusion corrugated portion 212 may be formed integrally with the reinforcing panel 230 and the main panel 210.

The reinforcing panel 230 may be made of the same material as the main panel 210.

Referring to the drawings, the inner chamber 300 may be configured to prevent the cushion 200 from colliding with the windshield W by pulling the cushion 200 in a process of unfolding the cushion 200 as a tip portion of the inner chamber 300 is joined to a portion of the cushion 200, facing the windshield W. That is, in the first section R1 facing the windshield W, the inner chamber 300 may be joined with the protrusion corrugated portion 212 to pull the first section R1, and accordingly, the first section R1 may be prevented from hitting the windshield W and applying an impact.

Further, the inner chamber 300 may be disposed inside the cushion 200 to distribute the introduced gas.

As illustrated in FIGS. 5 and 6, the inner chamber 300 may include a chamber strap 310 having substantially a band shape extending to be elongated in a longitudinal direction, and a flow hole 311 may be formed in a center of the chamber strap 310.

The inner chamber 300 may be joined to the mouth portion 211 in a structure in which the flow hole 311 of the chamber strap 310 is connected to the gas hole 211a, both ends of the chamber strap 310 in a longitudinal direction may be joined to the protrusion corrugated portion 212, and thus an inner space S in which gas is introduced through the gas hole 211a and the flow hole 311 may be formed.

The gas introduced into the inner space S may be distributed into the cushion 200 as the cushion 200 is expanded and the inner chamber 300 is unfolded.

The chamber strap 310 may include joining portions 312 formed at both ends thereof by folding portions of ends thereof. In detail, the joining portion 312 may be formed in a form in which the chamber strap 310 overlaps in two layers, and the chamber strap 310 may have a structure in which the joining portion 312 forms a stacked structure together with the protrusion corrugated portion 212 and is integrally joined to the protrusion corrugated portion 212 in a state in which the protrusion corrugated portion 212 protrudes inward from the cushion 200. That is, a first joining portion 312a on one side of the chamber strap 310 and a second joining portion 312b on the other side thereof may form a vertically stacked structure and may be joined to the protrusion corrugated portion 212.

In this way, the chamber strap 310 may be sewn with the protrusion corrugated portion 212 in a multi-layered structure through the joining portion 312, thereby increasing a binding strength. Thus, even when the cushion 200 is expanded and a tensile force is applied to the chamber strap 310, the joining portion 312 may be prevented from being torn and the protrusion corrugated portion 212 and the chamber strap 310 may be prevented from being separated.

In this case, a seam direction of the protrusion corrugated portion 212 and a seam direction of the joining portion 312 may be arranged in the same direction. That is, a folded portion of the protrusion corrugated portion 212 and a folded portion of the joining portion 312 are integrally sewn and joined to each other while arranged in the same direction. This makes it possible to integrally sew the protrusion corrugated portion 212 and the joining portion 312 and prevent a sewing line L from being easily torn by applying a force (tensile force) applied to the sewing line L in one direction when the chamber strap 310 is pulled.

In an embodiment, as illustrated in FIG. 7, the chamber strap 310 may have a structure in which the protrusion corrugated portion 212 is integrally joined to the joining portions 312 while inserted into the joining portions 312 so that the joining portions 312 provided at both ends thereof surround the protrusion corrugated portion 212. That is, the first joining portion 312a on one side of the chamber strap 310 may surround the protrusion corrugated portion 212 protruding inward form the cushion 200, and the second joining portion 312b on the other side thereof may form a structure surrounding the first joining portion 312a and may be joined to the protrusion corrugated portion 212.

Further, the seam direction of the protrusion corrugated portion 212 and the seam direction of the joining portion 312 may be arranged in the same direction.

In an embodiment, as illustrated in FIG. 8, the chamber strap 310 may include the joining portions 312 formed at both ends thereof by folding portions of ends thereof and may have a structure in which the joining portions 312 are integrally joined to the protrusion corrugated portion 212 while inserted into the protrusion corrugated portion 212 so that the protrusion corrugated portion 212 surrounds the joining portions 312. That is, in a state in which the protrusion corrugated portion 212 protrudes outward from the cushion 200, the first joining portion 312a on the one side of the chamber strap 310 and the second joining portion 312b on the other side thereof may be inserted into and integrally joined to the protrusion corrugated portion 212.

Further, the seam direction of the protrusion corrugated portion 212 and the seam direction of the joining portion 312 may be arranged in the same direction.

Meanwhile, a surface of the chamber strap 310, which is exposed to the inner space S, may be coated with silicone. In an embodiment, the surface of the chamber strap 310 may be coated with heat-resistant silicone such that the cushion 200 may be prevented from being damaged by high-temperature gas introduced into the inner space S.

Figure 9:
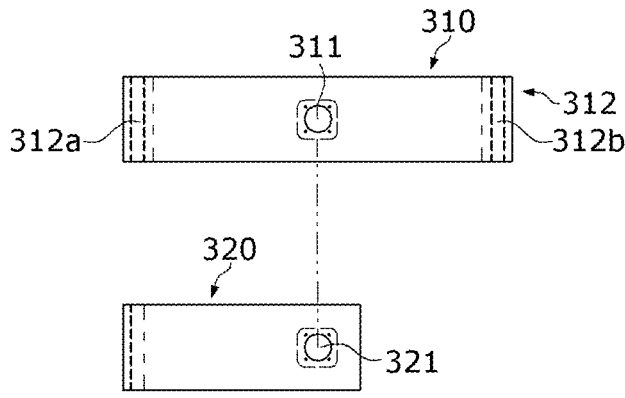
FIG. 9 is a view illustrating the inner chamber according to another embodiment.
Figure 10:
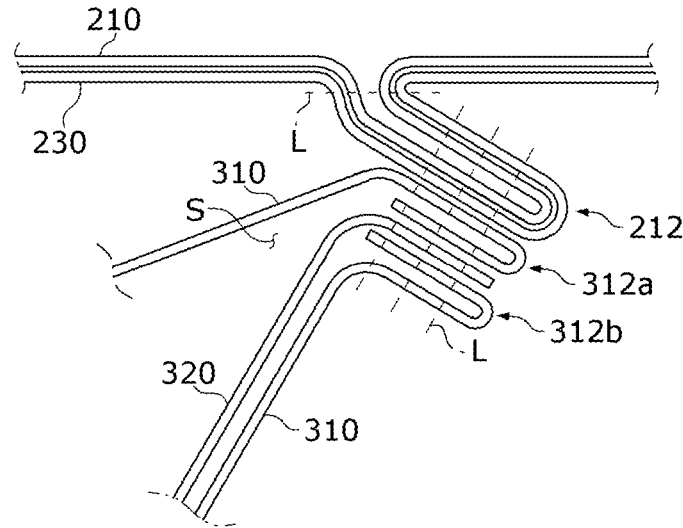
FIG. 10 is a view illustrating a state in which the inner chamber of FIG. 9 is joined to the protrusion corrugated portion.

FIGS. 9 and 10 illustrate the inner chamber according to another embodiment.

FIG. 9 is a view illustrating the inner chamber according to another embodiment, and FIG. 10 is a view illustrating a state in which the inner chamber of FIG. 9 is joined to the protrusion corrugated portion.

Referring to the drawings, the inner chamber 300 may further include a reinforcing strap 320.

One end of the reinforcing strap 320 may be joined to the mouth portion 211 and connected to the flow hole 311, and the other end thereof may be joined to the protrusion corrugated portion 212 together with the joining portion 312 of the chamber strap 310. Therefore, the reinforcing strap 320 may relieve a tensile force applied to the chamber strap 310.

In an embodiment, the reinforcing strap 320 may be sewn in a state of being fitted between the first joining portion 312a and the second joining portion 312b of the chamber strap 310. Further, a through hole 321 connected to the flow hole 311 may be formed.

The reinforcing strap 320 may be formed of the same material as the chamber strap 310. Further, a surface of the reinforcing strap 320, which is exposed to the inner space S, may be coated with heat-resistant silicone.

Figure 11:
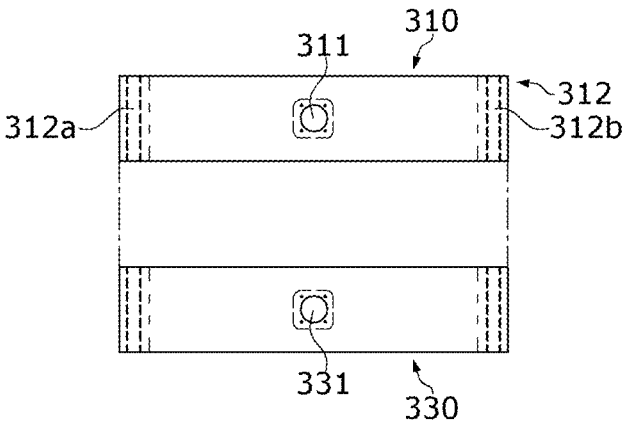
FIG. 11 is a view illustrating the inner chamber according to still another embodiment.
Figure 12:
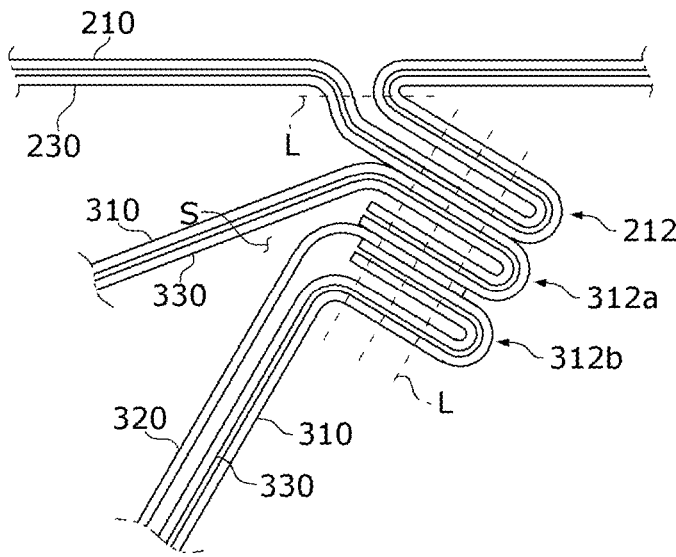
FIG. 12 is a view illustrating a state in which the inner chamber of FIG. 11 is joined to the protrusion corrugated portion.

FIGS. 11 and 12 illustrate the inner chamber according to still another embodiment.

FIG. 11 is a view illustrating the inner chamber according to still another embodiment, and FIG. 12 is a view illustrating a state in which the inner chamber of FIG. 11 is joined to the protrusion corrugated portion.

Referring to the drawings, the inner chamber 300 may further include an inner chamber strap 330 in which a flow hole 331 is formed.

The inner chamber strap 330 may have substantially the same structure as the chamber strap 310 and may be provided in the chamber strap 310 in an overlapping state to constitute an inner surface of the inner chamber 300. That is, the inner chamber 300 may have a two-layer structure in which the chamber strap 310 and the inner chamber strap 330 are stacked.

In an embodiment, a surface of the inner chamber strap 330, which is exposed to the inner space S, may be coated with silicone.

In this way, the inner chamber 300 may have a two-layer structure in which the chamber strap 310 and the inner chamber strap 330 are stacked, thereby increasing durability of the inner chamber 300. That is, as the cushion 200 is expanded, even when a tensile force is applied, the cushion 200 may be pulled without being easily torn or damaged. Thus, reliability of the airbag device may be improved.

As described above, according to an embodiment of the present invention, since the chamber strap 310 of the inner chamber 300 is joined to a portion of the cushion 200, which faces the windshield W, the cushion 200 to which the chamber strap 310 is joined may be pulled when the cushion 200 is expanded and unfolded, and thus the cushion 200 may be prevented from colliding with the windshield W.

In particular, the chamber strap 310 has the joining portion 312 folded in two layers, the cushion 200 has the protrusion corrugated portion 212 folded in two layers through tuck-in folding, and the joining portion 312 and the protrusion corrugated portion 212 are strongly bound by being integrally sewn in a state of being arranged in a multi-layered structure. Thus, even when a tensile force is applied to the chamber strap 310, the joining portion 312 and the protrusion corrugated portion 212 may be prevented from being torn and separated.

According to an embodiment of the present invention, an airbag device for a vehicle capable of preventing collision between an inflated cushion and a windshield and thus safely protecting an occupant may be provided.

The effects of the present invention are not limited to the effects described above, and those skilled in the art will clearly understand other effects not described based on the appended claims.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An airbag device for a vehicle, comprising:
an inflator configured to generate gas upon activation;
a cushion associated with the inflator and configured to expand as the gas is introduced from the inflator, and inflate toward an occupant of the vehicle; and
an inner chamber disposed inside the cushion and configured to distribute the gas introduced into the cushion, the inner chamber including a tip portion and a portion facing a windshield of the vehicle,
wherein the tip portion of the inner chamber is joined to a portion of the cushion that faces the windshield,
wherein the inner chamber is configured to pull the cushion as the cushion unfolds to prevent the cushion from colliding with the windshield,
wherein the cushion includes:
a main panel including a mouth portion in which a gas hole through which the gas is introduced is formed and a protrusion corrugated portion; and
a pair of side panels joined to both sides of the main panel,
wherein the main panel is partitioned into a first section on one side toward the windshield and a second section and a third section on another side toward the occupant when the cushion is expanded with respect to the mouth portion, and
wherein a width of the third section is greater than a width of the second section and a width of the first section.

2. The airbag device of claim 1, wherein the protrusion corrugated portion is configured to form a protruding folding structure by tuck-in folding a partial area in the first section of the main panel.

3. The airbag device of claim 1, wherein the inner chamber includes a chamber strap in which a flow hole is disposed, and
wherein the chamber strap is joined to the mouth portion in a structure in which the flow hole is connected to the gas hole, and both end portions of the chamber strap in a longitudinal direction are joined to the protrusion corrugated portion to form an inner space in which the gas is introduced through the gas hole and the flow hole.

4. The airbag device of claim 3, wherein the chamber strap includes:
joining portions disposed at both ends thereof by folding portions of the ends thereof; and
a structure in which the joining portion forms a stacked structure together with the protrusion corrugated portion and is integrally joined to the protrusion corrugated portion.

5. The airbag device of claim 4, wherein a seam direction of the protrusion corrugated portion and a seam direction of the joining portion are arranged in the same direction.

6. The airbag device of claim 3, wherein the chamber strap includes:
joining portions formed at both ends thereof by folding portions of the ends thereof; and
a structure in which the protrusion corrugated portion is integrally joined to the joining portions while inserted into the joining portions so that the joining portions surround the protrusion corrugated portion.

7. The airbag device of claim 3, wherein the chamber strap includes:
joining portions formed at both ends thereof by folding portions of the ends thereof; and
a structure in which the joining portions are integrally joined to the protrusion corrugated portion while inserted into the protrusion corrugated portion so that the protrusion corrugated portion surrounds the joining portions.

8. The airbag device of claim 3, wherein a surface of the chamber strap, which is exposed to the inner space, is coated with silicone.

9. The airbag device of claim 3, wherein the inner chamber further includes a reinforcing strap having one end joined to the mouth portion and connected to the flow hole and another end joined to the protrusion corrugated portion together with the chamber strap.

10. An airbag device for a vehicle having a windshield, the airbag device comprising:
an inflator configured to generate gas upon activation;
a cushion in communication with the inflator and configured to expand as the gas is introduced from the inflator, and inflate toward an occupant of the vehicle; and
an inner chamber disposed inside the cushion and configured to distribute the gas introduced into the cushion, the inner chamber including a tip portion and a portion facing a windshield of the vehicle,
wherein the tip portion of the inner chamber is joined to a portion of the cushion that faces the windshield,
wherein the inner chamber is configured to pull the cushion as the cushion unfolds to prevent the cushion from colliding with the windshield while allowing the cushion to unfold toward the occupant, wherein the cushion comprises:

a main panel including a mouth portion in which a gas hole through which the gas is introduced is formed, and a protrusion corrugated portion; and a pair of side panels joined to both sides of the main panel, wherein the main panel is partitioned into a first section on one side toward the windshield, and a second section and a third section on another side toward the occupant when the cushion is expanded with respect to the mouth portion, and wherein a width of the third section is greater than a width of the second section and a width of the first section.

11. The airbag device of claim 10, wherein the protrusion corrugated portion is configured to form a protruding folding structure by tuck-in folding a partial area in the first section of the main panel.

12. The airbag device of claim 10, wherein the inner chamber includes a chamber strap in which a flow hole is disposed, and wherein the chamber strap is joined to the mouth portion in a structure in which the flow hole is connected to the gas hole, and both end portions of the chamber strap in a longitudinal direction are joined to the protrusion corrugated portion to form an inner space in which the gas is introduced through the gas hole and the flow hole.

* * * * *